United States Patent
Das et al.

(10) Patent No.: US 12,456,307 B1
(45) Date of Patent: *Oct. 28, 2025

(54) SYSTEMS AND METHODS FOR TRAFFIC LIGHT DETECTION

(71) Applicant: Zoox, Inc., Foster City, CA (US)

(72) Inventors: Subhasis Das, Menlo Park, CA (US); Amir Ghaderi, San Jose, CA (US); Derek Xiang Ma, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 18/060,096

(22) Filed: Nov. 30, 2022

(51) Int. Cl.
*G06V 20/58* (2022.01)
*G06V 10/764* (2022.01)

(52) U.S. Cl.
CPC .......... *G06V 20/582* (2022.01); *G06V 10/764* (2022.01); *G06V 20/584* (2022.01)

(58) Field of Classification Search
CPC ... G06V 20/582; G06V 20/584; G06V 10/764
See application file for complete search history.

(56) References Cited

U.S. PATENT DOCUMENTS

| | | | |
|---|---|---|---|
| 11,450,117 B2* | 9/2022 | Goel | G06V 20/58 |
| 2018/0032078 A1* | 2/2018 | Ferguson | G05D 1/0214 |
| 2020/0135030 A1* | 4/2020 | Krivokon | G08G 1/167 |
| 2020/0210721 A1* | 7/2020 | Goel | G06V 10/82 |
| 2021/0197813 A1* | 7/2021 | Houston | B60W 30/143 |
| 2022/0119012 A1* | 4/2022 | Agon | G06V 20/56 |
| 2025/0068960 A1* | 2/2025 | Yu | G06N 3/08 |

* cited by examiner

*Primary Examiner* — Shaghayegh Azima
(74) *Attorney, Agent, or Firm* — Lee & Hayes, P.C.

(57) ABSTRACT

Techniques for detecting and labeling traffic lights and/or traffic signs and the traffic lanes with which such lights and signs are associated in an environment are disclosed. Images may be evaluated to identify pixels that may be associated with a light, sign, or lane. Associations between lights and/or signs and lanes in the environment may be determined along with probabilities for the individual pixels that the pixels may be associated with one of the light/sign and lane associations. Those pixels having a sufficient probability of be associated with a light/sign and lane association may be assigned a corresponding label. An output image with such labels can be provided for vehicle control and for other operations, such as top-down segmentation and trajectory determination.

20 Claims, 5 Drawing Sheets

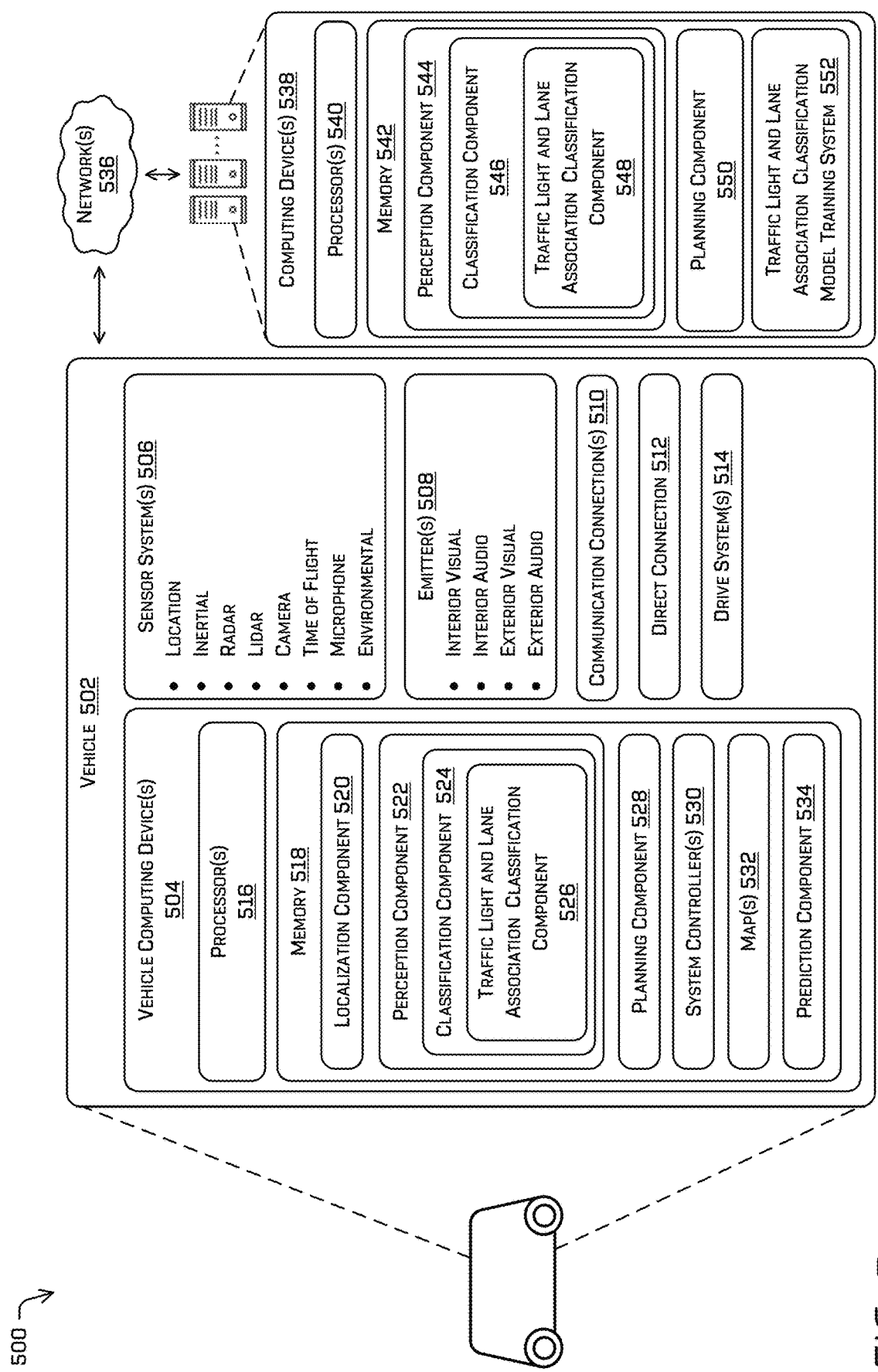

SYSTEMS AND METHODS FOR TRAFFIC LIGHT DETECTION

BACKGROUND

Various vehicle systems and techniques are utilized to perform detection of features in environments and classification of such features for purposes of determining vehicle control operations and performing other actions. For example, autonomous vehicles may be configured with various types of sensor systems (e.g., lidar, radar, sonar, vision, etc.) that may be used to detect and classify drivable and/or non-drivable surfaces in an environment. Such sensor systems may also detect objects in the environment (e.g., pedestrians, other vehicles, obstacles, etc.). Based on these detected surfaces and/or objects, an autonomous vehicle may determine a route and/or trajectory through an environment and/or controls that may be used to safely navigate the vehicle through the environment. Traffic control and guidance objects, such as traffic lights and traffic signs, may be configured in an environment to assist and direct vehicles traveling through the environments. These objects may be applicable to particular portions of a drivable surface, such as particular lanes. For example, a traffic light may be used to control traffic in a turn lane of a multi-lane roadway. It may, at times, be challenging to accurately detect and associate a traffic light or a traffic sign with a particular lane of a roadway for which that light or sign is intended to control vehicular traffic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a block diagram of an example system for implementing the techniques described herein.

DETAILED DESCRIPTION

Figure 1:
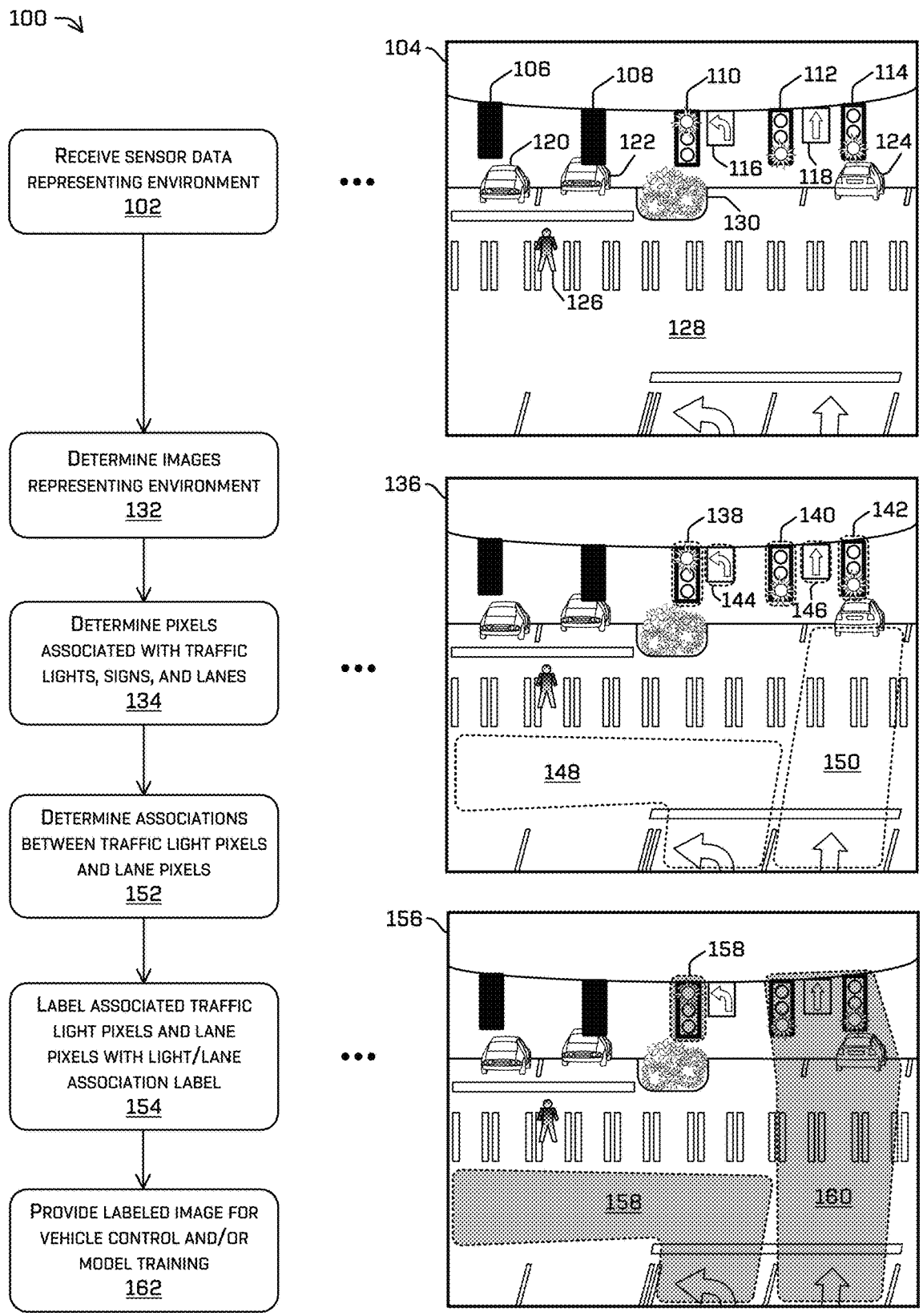
FIG. 1 is a pictorial flow diagram of an example process for determining traffic light and lane association classifications for image data, in accordance with examples of the disclosure.

Techniques for improving the detection and classification of traffic lights, traffic signs, and the traffic lanes associated with them in an environment discussed herein may include using two-dimensional sensor viewpoint representations of an environment to identify and classify these and other features of an environment. The disclosed techniques may also include integrating associated traffic light and lane classifications and/or associated traffic sign and lane represented in two-dimensional representations into vehicle computing system components and processes to perform various operations related to vehicle control. The disclosed techniques may further be used to improve the training of a machine-learned model to detect and classify associated traffic lights and lanes and associated traffic signs and lanes using training data that includes representations of various types of classified features and/or labeled objects. The model may then be used, for example in conjunction with sensor and/or perception systems and/or other classification systems and/or components, to detect and label traffic lights and traffic lanes that are associated with one another and traffic signs and traffic lanes that are associated with one another in a real-world environment in which a vehicle may be traveling.

An environment in which a vehicle may be traveling may include various types of surfaces, regions, and/or areas. For example, an environment may include one or more drivable regions that may be divided into lanes of traffic intended for specific purposes. For example, a drivable region may include one or more lanes dedicated to a particular direction of traffic and/or traffic function (e.g., a turn lane). The environment may further include one or more objects intended to control or guide vehicles traveling in the drivable region, such as one or more traffic lights and/or traffic signs. A particular traffic light or sign may be intended to control traffic in a particular lane of a drivable region. For example, a particular traffic light may indicate whether traffic in a certain turn lane is allowed to proceed with turning left from that lane (e.g., onto a cross-street). A traffic control object may be permanent or temporary (e.g., temporary signs or lights put up during road construction). A traffic control object may further take the form of a person in the environment that is controlling traffic (e.g., a flagger waving a flag for driver attention, a person holding and manipulating traffic signs manually, etc.).

While traffic signs and lights may be logically oriented proximate to one or more lanes with which they may be associated, often lights and signs are placed according to restrictions in the environment that may make it difficult to determine accurately the lanes meant to be controlled by such signs and lights. For example, traffic signals may be placed on poles at street corners and intended to control one or more lanes in the middle of a multi-lane roadway because it may not be possible to suspend such lights directly over their corresponding lanes. In some environments, there may be signs accompanying traffic lights that indicate the intended purpose of such lights. However, indicators like these signs may still make it difficult to determine the intended function of traffic lights in such environments from images and other data collected by sensors in those environments. Mapping data may be used to determine the purpose of traffic lights and signs and the lanes with which they are associated, but such data may be voluminous and require extensive resources to process, making the use of such mapping data time-consuming and inefficient for determining traffic light and/or sign and lane associations, especially during operation of a vehicle (e.g., an autonomous vehicle) in real-time in an operational environment. Sensor data and other environmental data collected by vehicles traveling in an environment may also be used to determine the purpose of traffic lights and signs and the lanes with which they are associated, but, like mapping data, such data may also be voluminous and resource-intensive to process.

An environment in which a vehicle may be traveling may also include one or more other types of objects and/or features. For example, other vehicles may be traveling through the environment, including typical passenger and cargo vehicles and/or other types of vehicles, such as bicycles. Pedestrians may be present in the environment along with animals (e.g., pets and/or wildlife). Stationary objects, such as buildings, street signs, lane markings, etc., may also, or instead, be present in such an environment. An environment may also include non-drivable surfaces or regions, such as sidewalks, medians, wilderness, road shoulders, etc. A vehicle operating within such an environment may be equipped with one or more sensor systems that allow the vehicle to collect data from the environment. The vehicle may use this data to categorize and/or label the objects and features in the environment in order to safely navigate the vehicle through the environment. However, these labeling and classification operations may be challenging due to the number of objects, regions, and features that may require labels. A further challenge is that multiple portions of the environment may correspond to a single purpose and therefore may be suited for a single particular classification. For instance, a lane of a roadway and a traffic light associated with that lane may together be intended to control the traffic flow in the section of roadway associated with the lane. Further complicating this example is that this lane may also qualify as a drivable region while the traffic signal may qualify as a stationary object.

The techniques described herein may improve the accuracy of detecting traffic lights and/or signs and the particular lanes in a roadway with which they are associated for use in the operation of a vehicle. The techniques described herein may also improve the accuracy of distinctly labeling traffic light and lane combinations and traffic sign and lane combinations by one or more machine-learned models trained and/or executed according to the disclosed examples.

When a vehicle (e.g., an autonomous vehicle) traveling in an environment does not accurately associate a traffic sign or a traffic light with a traffic lane that the sign/light is intended to control, the vehicle risks not operating according to the control information provided by the sign/light. This may result in creating a potentially hazardous condition. Thus, accurate association of traffic signs and lights with the traffic lanes such signs and/or lights are intended to control is related to safe operation of the vehicle and efficient movement of the vehicle through an environment. The disclosed techniques can improve the labeling of traffic lights, traffic signs, any other types of traffic control objects (e.g., flagger, person holding traffic sign, etc.), traffic lanes and any other type of drivable region, and, in particular, the combinations of traffic lights and lanes, traffic signs and lanes, traffic control objects and lanes, traffic lights and drivable regions, traffic signs and drivable regions, and traffic control objects and drivable regions to a high degree of accuracy to support autonomous vehicle operations. The disclosed techniques can also improve the accuracy of labeling of object detection, image segmentations, and/or image pixels to support autonomous vehicle operations. "Detection" and "segmentation" may be used herein to describe any portion of an image associated with a particular object, feature, or other aspect of environment and any data associated with such an object, feature, or aspect (e.g., labels, classifications, categorizations, etc.).

As used herein, "labeling" or determining a classification for a pixel or other data element may refer to assigning a label that is predicted to be ultimately assigned to that pixel or element. For example, various data structures (e.g., images, lidar point clouds, etc.) may represent a same portion of an environment at a same time, where the individual data structures may include different types of labels associated with various data elements (e.g., lidar points, pixels, voxels, etc.) in the data structure (e.g., one data structure for a first type of label (e.g., drivable or non-drivable labels), another for second type of label (e.g., light/lane association labels), etc.). The labels in such data structures may represent predicted labels for the represented pixels or data elements and, in some examples, may be accompanied by confidence factors or other indications of label prediction confidence. These data structures may then be used to determine an ultimate labeled data structure with final labels determined for the pixels or data elements and that may be used to control a vehicle.

In various examples, a vehicle computing system may receive sensor data from one or more sensors configured at a vehicle. Such a vehicle may be configured with one or more sensor systems (lidar, radar, sonar, cameras, time-of-flight, etc.). These sensors systems may include emitters configured to emit electromagnetic radiation (e.g., light, sound, lasers, etc.) or other types of emissions into an environment and/or detect electromagnetic radiation and/or other emissions present in the environment (e.g., reflected from surfaces in the environment and/or emitted from objects in the environment). These sensor systems may generate or otherwise determine sensor data based on the detected emissions in the environment and provide this sensor data to the vehicle computing system. Using this sensor data, the vehicle computing system may determine or generate two-dimensional images, three-dimensional data, and/or scenes representing the environment. Such images may represent a portion of the environment as viewed or perceived from the point of view of the sensor. For example, an image may represent a picture of the environment as captured by a camera configured at the vehicle. However, any type of sensor data or combination of various types of sensor data may be used to generate one or more images representing a portion of an environment captured from any perspective. Such "images" may include traditional image data (red, green, blue (RGB) data) and/or may provide a data structure that may be used to represent other types of data.

The vehicle computing system may use one or more feature classification components to label or otherwise categorize objects, features, and/or regions represented in an image (e.g., a two-dimensional image) representing a portion of the environment. In some examples, the vehicle computing system may generate a feature labeled image that includes this labeling information. In such examples, individual pixels of the image may be assigned a respective label associated with the object, feature, regions, etc. represented by that pixel. Labels may be determined based on a variety of factors, such as confidence factors. For example, a particular pixel may be associated with a candidate object label with a confidence factor indicating a 60% confidence that the associated pixel represents an object and a candidate drivable region label with a confidence factor indicating a 95% confidence that the associated pixel represents a drivable regions. In another example, a first pixel may be associated with a candidate traffic light label with a confidence factor indicating an 80% confidence that the first pixel represents a traffic light object while a second pixel may be associated with a candidate traffic lane label with a confidence factor indicating a 90% confidence that the second pixel represents a traffic lane portion of a drivable region. In such an example, these first and second pixels may also, or instead, individually be associated with a particular associated traffic light and lane label with a confidence factor indicating an 85% confidence that the first pixel and the second pixel are associated with a combination of a particular traffic light that is intended to control a particular traffic lane. The system may determine a label, or a predicted label, for this particular pixel based on these confidence factors by, for example, determining that the label is at or above a label confidence threshold (e.g., 50%, 75%, etc.).

In various examples, the vehicle computing system may also, or instead, use a traffic light and lane association classification component to predict or determine a label or otherwise categorize traffic light and lane associations in an image. As used herein, a "traffic light and lane association" may refer to one or more traffic lights and/or one or more traffic signs that may be associated with one or more traffic lanes. A labels indicating such an association may be referred to as a "light/lane association label." In various examples, a traffic light and lane association classification component may provide images and/or other classification data with traffic light and lane association label data for use by the vehicle computing system to determine controls for controlling the vehicle through an environment. In examples, this traffic light and lane association label data may be used in combination with other label data that may be generated by one or more other components of implemented at and/or interacting with the vehicle computing system. Alternatively or additionally, one or more components implemented at and/or interacting with the vehicle computing system may determine or predict traffic light and lane association labels ("light/lane association labels") as well as other labels that may be used to determine controls for controlling the vehicle through an environment.

In examples, the traffic light and lane association classification component may be trained using images and/or other data that includes traffic light and lane association labels. For training the disclosed traffic light and lane association classification component, log data may be used that includes unified and/or three-dimensional scene data as well as corresponding perspective views from imaging sensors that may include raw sensor data and/or labeled data (e.g., that may or may not include traffic light and lane association labels). Examples of the formats that may be used for log data that may include unified and/or three-dimensional scene data and perspective views are provided in U.S. patent application Ser. No. 16/219,623, filed Dec. 13, 2018, entitled "Device Message Framework," the entirety of which is incorporated herein by reference for all purposes In some examples, a traffic light and lane association labeled image may be generated or otherwise determined that includes traffic light and lane association labeling information determined manually (e.g., by a human user) and/or using one or more other operations. In such examples, individual pixels of the image may be assigned a respective traffic light and lane association label associated with a light or lane represented by that pixel and determined to be associated with an identified light/lane association. For example, a particular light may be determined to be associated with a particular left turn lane (e.g., identified as intended to control traffic turning left from that lane). In response, the individual pixels representing the light and the individual pixels representing the left turn lane may be labeled with the same "light/left turn lane" label. Where there are more than one particular types of combinations of a lights and lanes, further label granularity may be used. For example, if there are two left turn lanes in an environment and an individual traffic light is associated with the individual lanes, a "light/left turn lane X" label may be used for one such light/lane combination and a "light/left turn lane Y" label may be used for the other.

The traffic light and lane association classification component may provide a light/lane labeled image to the vehicle computing system to determine a labeled output image. For example, the vehicle computing system may compare the labels of individual pixels of the light/lane labeled image to labels assigned to corresponding pixels in other types of labeled images to determine a label to assign to that pixel in a labeled output image that may be used to control the vehicle. To make this determination, the vehicle computing system may use a hierarchical labeling process based on the significance of the potential labels for the individual pixel. In some cases, significance may be represented by one or more significance factors that may be based on one or more of various criteria, such as one or more object detection and/or image segmentation properties, attributes, or characteristics (e.g., attributes of the object, region, feature, surface, etc. associated with the detection or segmentation associated with a pixel). For example, the system may determine whether a pixel is associated with a detection that is associated with a drivable or non-drivable region. The system may also, or instead, determine a risk or risk probability (e.g., potential collision probability associated with the portion of the environment represented by the pixel) associated with the detection that may be associated with the pixel. In some examples, label significance redundancy may be used a criteria for label selection. For example, a pixel may represent a road barrel that is in light/lane labeled portion of the environment. Because a road barrel may necessarily represent a non-drivable region of the environment, the system may label pixels representing the road barrel as non-drivable region pixels or as road barrel pixels instead of light/lane pixels.

In some examples, the vehicle computing system may assign a single label to an individual pixel as described above. In other examples, the vehicle computing system may assign more than one label to an individual pixel. For example, where a pixel is associated with both a light/lane association and a drivable roadway, the vehicle computing system may retain or otherwise associated both corresponding labels to that pixel. By using multiple labels for individual pixels, the vehicle computing system may make this label data available for other systems (e.g., a light/lane association label may be used by a trajectory determination system for short distance trajectory determination, while a drivable roadway label may be used by a route planning system for longer distance route generation).

The vehicle computing system may also, or instead, perform other operations to determine additional data that may be included in or otherwise associated with the labeled output image. For example, the vehicle computing system may perform one or more instance segmentation operations to determine a direction value to assign to individual pixels in the output image. The vehicle computing system may also, or instead, perform one or more (e.g., monocular) depth operations to determine a depth value to assign to individual pixels in the output image. The vehicle computing system may also, or instead, perform one or more occlusion and/or truncation determination operations to determine an occlusion and/or truncation value to assign to individual pixels in the output image.

An image labeled with light/lane association labels may be used to train a traffic light and lane association detection model and/or by a vehicle computing system to perform further operations that may, for example, be associated with controlling the vehicle. For example, the light/lane association labeled output image may be "fused" with one or more other labeled images (e.g., associated with one or more other sensors) and/or used in combination one or more such images to determine a resulting output image that may be used to control a vehicle. In such examples, labels for such a resulting output image (e.g., for individual pixels in such an image) may be determined using one or more of the hierarchical labeling techniques, including those described herein. For example, in an image fusion operation, the system may evaluate the labels associated with pixels in separate images (e.g., originating with separate sensors and/or labeled by separate machine-learned models or systems) that represent a same or substantially similar portion of an environment using one or more of the hierarchical labeling techniques described herein to determine a label for a corresponding pixel in the resulting output image.

In examples, the vehicle computing system may further determine two-dimensional bounding regions (e.g. bounding boxes or other shapes) for the light/lane association areas represented in the labeled output image. In various examples, there may be multiple bounding regions of pixels associated with a single classification label (e.g., a region of pixels representing a light and a region of pixels representing a lane associated with the light, where both regions are assigned the same light/lane association label). For example, pixels associated with a single light and a single associated lane may be assigned single classification label. Alternatively, pixels associated with a single light and multiple lanes that the single light controls may be assigned a single classification label. In another alternative, pixels associated with multiple lights and a single lane that the multiple lights control may be assigned a single classification label. In another example, pixels associated with multiple lights and multiple lanes that the multiple lights control may be assigned a single classification label. In such examples, the multiple lights may be intended to control the multiple lanes generally, or individual lights of the multiple lights may be intended to control individual lanes of the multiple lanes (e.g., three left turn lights intended to control three adjacent left turn lanes). In either example, the pixels associated with the multiple lights and lanes may be assign a single particular light/lane label.

These two-dimensional bounding regions may be used by one or more other classification, segmentation, planning, prediction, and/or other systems operated by the vehicle computing system. Such boxes or shapes may be determined based on the probabilities that the pixels are associated with a particular light/lane association combination. For example, the pixels having at least a threshold probability of being associated with a particular light/lane association label may assigned that label while those that do not have at least the threshold probability of being associated with the particular light/lane association label are not assigned that label.

In various examples, a light/lane association labeled output image may also, or instead, be provided to a top-down segmentation component to generate a top-down representation of the environment that includes the light/lane associations identified in the light/lane association labeled output image. This top-down representation may then be used by, for example, a prediction component configured at the vehicle to more accurately predict object trajectories and other aspects of objects present within the environment, which in turn may increase the safety and efficiency of vehicle operation. For example, a prediction component may use the light/lane associations determined using the techniques described herein to predict whether another vehicle in the environment will make a turn (e.g., whether the other vehicle is in a turn lane with a traffic light).

In various examples, a system may train a machine-learned model to perform traffic light and lane association detection and labeling using a training dataset that includes data representing detections of various types based on sensor data collected in an environment. For example, the dataset may include one or more multichannel data structures where individual channels of the data structure may represent data associated with a particular type of sensor or particular sensor system (e.g., vision, lidar, radar, sonar, time-of-flight, etc.). In examples, individual channels of the data structure may also, or instead, represent data associated with a particular individual sensors or sensor systems (e.g., that may be used in a fusion process as described herein). Examples of processing multichannel data structures and/or data associated with multiple sensors and other data sources to determine environmental information are provided in U.S. patent application Ser. No. 16/941,815, filed Jul. 29, 2020, now U.S. Pat. No. 11,361,196, issued Jun. 14, 2022, entitled "Object Height Estimation from Monocular Images," and U.S. patent application Ser. No. 17/520,496, filed Nov. 5, 2021, entitled "Sensor Perturbation," the entireties of both of which are incorporated herein by reference for all purposes.

In some examples, the training dataset may also, or instead, include one or more images or other two-dimensional representations of an environment based on one or more types of sensor data. The sensor data used to determine such images may or may not be included in the training dataset (e.g., as one or more multichannel data structures). Such images may represent a particular two-dimensional perspective "view" of the environment representing data captured from the perspective of a particular sensor or set of sensors (e.g., an image captured by a camera, a two-dimensional representation of lidar data captured by a lidar sensor, a two-dimensional representation of radar data captured by a radar sensor, a two-dimensional representation of sonar data captured by a sonar sensor, any combination of these, etc.). The training dataset may also, or instead, include top-down images of the environment representing data captured from a top-down perspective. The images or two-dimensional representations of the environment in a training dataset may include or be associated with one or more labels. For example, individual pixels in such images and/or individual detections and/or segmentations in training data may be associated with one or more labels. Such labels may indicate that a pixel, detection, or segmentation is associated with a particular type of object, feature, or region (e.g., drivable road, sidewalk, pedestrian, vehicle, bicycle, dog, bird, etc.). In some examples, the training data may also, or instead, include light/lane association labels for one or more pixels, detections, or segmentations. In some examples, an individual pixel may be associated with two or more labels as described herein (e.g., a light/lane association labels and a non-drivable region label). Other data may also be associated with the individual pixels and/or the images included in the training dataset, such as direction data, depth data, occlusion data, and/or truncation data.

The training data may then be used to train a machine-learned traffic light and lane association detection and classification model. Such a model may be executed at a vehicle computing system to perform traffic light and lane association detection and classification as described herein. Output from such a model may also, or instead, be used as further training data. For example, a model may be executed using training data to generate output data that may then be used as input training data to further train the model.

As described herein, the output data determined using the disclosed techniques, including images, pixels, and associated labels, may be used to train one or more machine-learned models to preform various operations. For example, the labeled image data determined herein may be used as training data to improve the operations performed by a machine-learned model for identification and classification of traffic light and lane associations. Examples of training a machined-learned model and performing a labeling process are provided in U.S. patent application Ser. No. 17/215,938, filed Mar. 29, 2021, entitled "Hierarchical Machine-Learning Network Architecture," the entirety of which is incorporated herein by reference for all purposes.

When a machine-learned model trained according to the disclosed techniques is executed in a vehicle computing system, the model may perform traffic light and lane association determinations and labeling that may be used to control the vehicle. For example, based on light/lane association determinations and labeling, the vehicle computing system may determine a vehicle trajectory that addresses the presence of the turn lane controlled by a light or a sign when planning a vehicle trajectory or adjusting a vehicle trajectory. Additionally or alternatively, the labeled images generated using the disclosed techniques may be provided to a planning component of the vehicle and/or used to generate a top-down segmented representation of the environment that may be provided to such a planning component. In such an example, the planning component may use these images, labels, and/or associated data in determining a trajectory for the vehicle.

In examples, during inference mode data from multiple two-dimensional imaging sensors can be fused into a unified representation of a scene. Segmented and/or labeled images including light/lane association labels can be output from each of multiple two-dimensional imaging sensors using the disclosed techniques. Fusing the output from the two-dimensional sensors into a unified space may include representing the unified space as a top-down multichannel imagine that may include data from other sensors. The top-down multichannel image may include light/lane association labels for pixels contained therein that are determined from each of the two-dimensional imaging devices. When combining data from multiple two-dimensional imaging devices, there may be competing labels assigned to pixels of the unified space (e.g., when one label from a first camera disagrees with a label from a second camera for the corresponding pixel). In such instances, the hierarchical labeling techniques disclosed herein may be used to determine appropriate label(s) to ultimately assign to the unified space. For example, a light/lane association label may take priority over other labels to enhance safety of a vehicle. In still other examples, conflicting labels may be resolved via a confidence metric wherein a confidence score per label may be assigned and averaged. Examples of top-down segmentation and other segmentation operations are provided in U.S. patent application Ser. No. 15/963,833, filed Apr. 26, 2018, now U.S. Pat. No. 10,649,459, issued May 12, 2020, entitled "Data Segmentation using Masks," the entirety of which is incorporated herein by reference for all purposes.

In various examples, during inference mode and/or in the performance of fusion operations, conflicting labels may be resolved for a unified representation of the environment based on a variety of criteria. For example, confidence values associated with the labels that may be associated by different sensor systems with a pixel in the unified space may be used to determine the label for that pixel in the unified space (e.g., assign the label with the highest confidence value to that pixel). In another example, a particular hierarchy may be applied similar to that described herein, where a more significant label may be assigned or less significant label (e.g., based on potential risk or increased safety). For instance, a dynamic object may be selected over a light/lane association label, while a light/lane association label may be selected over a drivable region label. In another example, particular labels may be weighted based on various criteria (e.g., labels associated with potential risks or safety conditions may weighted higher than others). In other examples, labels may be averaged to determine a particular label for a pixel in unified space. This averaging may take into account weighted and/or unweighted confidence values of candidate labels in determining a label to assign to a pixel in unified space. The weighting may depend on which camera likely has the best field of view based on its location and orientation on a vehicle and the relative location of the light, sign, and/or lane portion corresponding to the respective pixel from each camera.

The systems and techniques described herein may be directed to training, executing, and leveraging machine-learned models, sensor data, and associated data to improve light/lane association detections and other types of detections used by a vehicle, such as an autonomous vehicle, in an environment. More specifically, the disclosed systems and techniques may be directed to facilitating more accurate detection of associated traffic lights and/or signs and traffic lanes and reducing false designations of drivable regions as uncontrolled drivable regions (uncontrolled by one or more traffic lights and/or signs). Using this improved data, such a vehicle may generate safer and more efficient trajectories for use in navigating through an environment. In particular examples, the systems and techniques described herein can utilize various types of sensor data and/or images in training datasets to train machine-learned models to more accurately and efficiently determine whether regions in an environment are lanes that are controlled by a light and/or a sign. By using these models trained according to the disclosed examples, vehicle computing systems may more accurately distinguish between regions in the environment associated with a light and/or sign and lane combination and regions that are freely drivable or otherwise uncontrolled by a sign or light. The examples described herein may result in increased certainty and accuracy in light/lane association regions and other region type detections, thereby allowing an autonomous vehicle to generate more accurate and/or safer trajectories for the autonomous vehicle to traverse in the environment.

For example, techniques described herein may increase the reliability of the determination of types of regions in the environment, reducing the likelihood of inaccurately designating a region as generally drivable or as controlled by a traffic light and/or sign. That is, the techniques described herein provide a technological improvement over existing region detection and/or classification technology and vehicle tracking and/or navigation technology. In addition to improving the accuracy of light/lane association detections and classifications of such portion of an environment, the systems and techniques described herein can provide a smoother ride and improve safety outcomes by, for example, more accurately providing safe passage to an intended destination through an environment that includes one or more lanes that are associated with one or more traffic lights and/or signs. Moreover, the systems and techniques may prevent unnecessary braking or hard-braking to avoid hazards such as oncoming vehicles or late-determined red lights detected in areas that have been inaccurately labeled as generally drivable and that can safely be passed through.

The techniques described herein may also improve the operation of computing systems and increase resource utilization efficiency. For example, computing systems, such as vehicle computing systems, may more efficiently perform light/lane association determinations using one or more machine-learned models trained according to the techniques described herein because, instead of using voluminous mapping or logging data to determine traffic light/sign and lane associations, the disclosed examples may reduce the amount of resource required to process such mapping or logging data. The disclosed examples may also reduce the data processing required to determine and label light/lane associations because the machine-learned models trained according to the disclosed examples may increase the accuracy of such determinations, thereby reducing the need to correct and/or adjust labeling by other systems and processes (e.g., manually or by other components) associated with a vehicle computing systems. This reduction in extraneous processing therefore increases the overall efficiency of such systems over what would be possible using conventional techniques. Moreover, the techniques discussed herein may reduce the amount of data used by computing systems to determine and process light/lane association labels as the number of labels applied to various pixels may be reduced due to improved accuracy of labeling, which may reduce latency, memory usage, power, time, and/or computing cycles required to detect and categorize light/lane association portion of an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, any one or more of various types of sensors and emitters are contemplated, as well as various types of sensor data (e.g., lidar, sonar, radar, vision). Furthermore, the disclosed systems and techniques may include using various types of components and various types of data and data structures, including, but not limited to, various types of image data and/or sensor data (e.g., stereo cameras, time-of-flight data, radar data, sonar data, vision data, lidar data, and the like). For example, the techniques may be applied to any such sensor systems. Additionally, the techniques described herein can be used with real data (e.g., captured using sensor(s)), simulated data (e.g., generated by a simulator), or any combination of the two.

FIG. 1 is a pictorial flow diagram of an example process 100 for detecting and labeling traffic light and traffic lane associations in an environment in which a vehicle may be operating and/or for determining training data that may be used to train a machine-learned model to detect and label traffic light and traffic lane associations. In some examples, one or more operations of the process 100 may be implemented by a vehicle computing system, one or more components of a vehicle computing system, and/or a system configured to train or otherwise configure a vehicle computing system and/or one or more components therein. Any such system may be referred to herein as a "vehicle computing system." In various examples, the process 100 may be used in a system configured to train a traffic light and traffic lane association detection and labeling model. Such vehicle computing systems may include and/or implement one or more of the components and systems illustrated in FIGS. 3-5 and described below.

Figure 3:
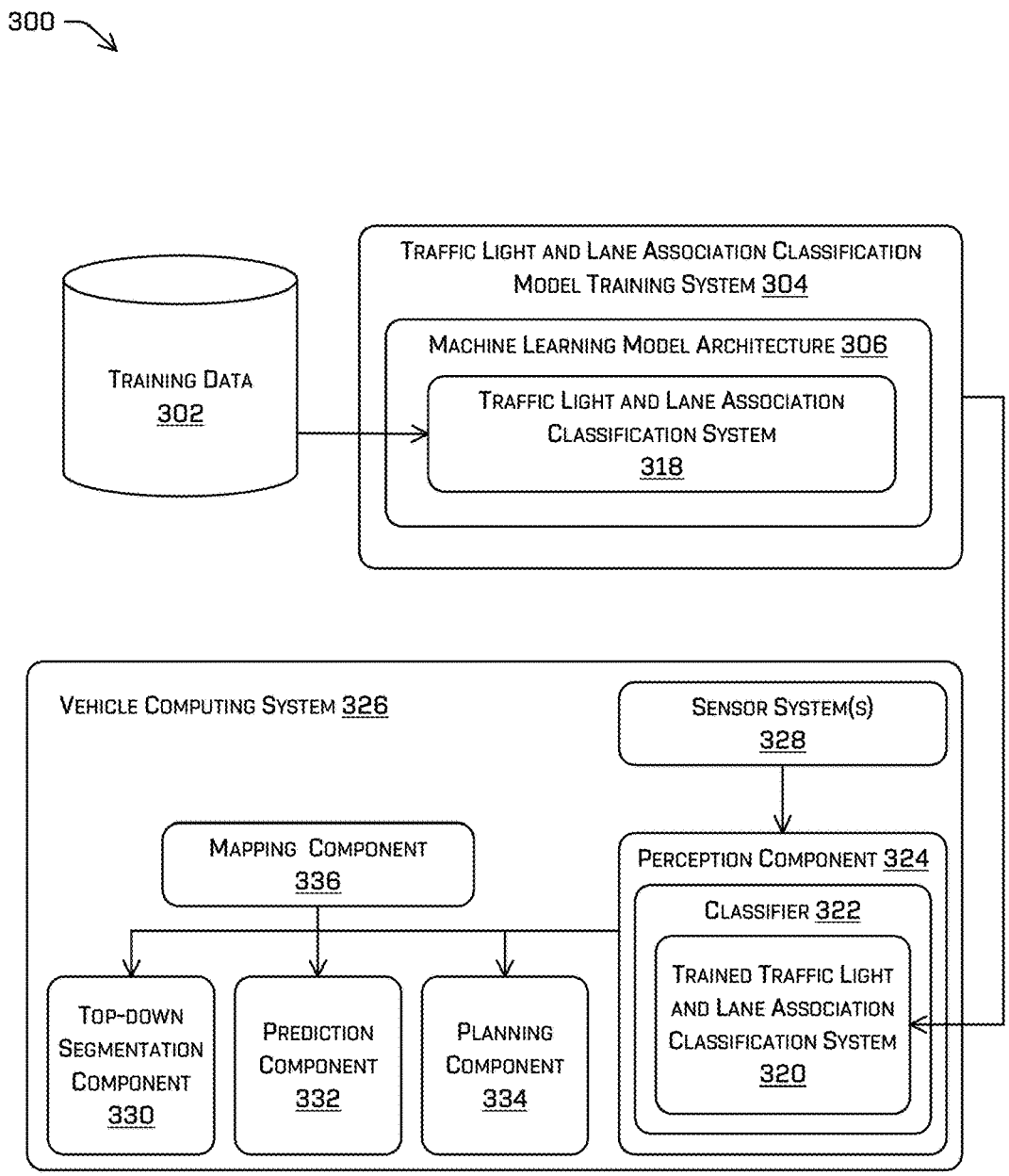
FIG. 3 is a block diagram of an example traffic light and lane association classification system, in accordance with examples of the disclosure.

For example, one or more components and systems can include those associated with one or more of the trained traffic light and lane association classification system 320, the classifier 322, the classifier(s) 408, the classification component 524, the traffic light and lane association classification component 526, one or more sensor systems 404 and 506, one or more of the perception components 324, 406, and 522, and/or one or more of the planning components 334, 418, and 528. In some examples, the one or more operations of the process 100 may also, or instead, be performed by a remote system that may be in communication with a vehicle, such as the classification component 546, the traffic light and lane association classification components 548, the perception component 544, and/or the planning component 550 of the computing device(s) 538 illustrated in FIG. 5. In some examples, the one or more operations of the process 100 may also, or instead, be performed by a remote system that may be configured to train a machine-learned model, such as the traffic light and lane association classification model training system 552 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 102, sensor data representing an environment in which a vehicle may be traveling may be received at a vehicle computing system or other computing system. For example, the system performing the operations of process 100 may be a system for executing and/or training one or more machine-learned models and/or for generating training data for use in training a machine-learned model. In particular examples, this sensor data may include one or more types of sensor data associated with one or more types of sensor systems, including, but not limited to, vision data associated with a vision system, lidar data associated with a lidar system, radar data associated with a radar system, sonar data associated with a sonar system, etc. In various examples, the sensor data may include two-dimensional representations of a portion of an environment determined based on sensor data and associated with a particular sensor perspective. For example, such two-dimensional representations may include images or scenes captures by a camera configured at a vehicle (e.g., a "two-dimensional sensor perspective image"). While referred to herein generally as "images," any two-dimensional representation of an environment described herein may be associated with any sensor perspective and may be generated or otherwise determined using any type of sensor data and/or any combination of multiple types of sensor data.

In various examples, the data received at operation 102 may also, or instead, include mapping data and/or logging data. In various examples, the data received at operation 102 may be a combination or fusion of such data into a dataset of one or more data structures. For example, mapping data and/or logging data collected and/or generated by one or more vehicles traversing the environment may be received at operation 102. This mapping and/or logging data may include one or more labels associated with one or more pixels or other data structures represented in such data. Such labels may include one or more light/lane labels indicating associated traffic lights and lanes and/or traffic signs and lanes. Such labels may also, or instead, include other types of labels, such as object labels, region labels, etc. Labels in such data may be generated or otherwise determined by one or more components (e.g., classification components) of a perception system configured at one or more vehicles traversing the environment, for example as described herein.

An example 104 illustrates a portion of an environment from the perspective of a vehicle traveling in the environment that may be represented by sensor data such as that received at operation 102. Various types of object and regions may be included in the portion of the environment represented in example 104. For example, traffic lights 106, 108, 110, 112, and 114 may be configured in the environment, with lights 106 and 108 facing away from the vehicle perspective (e.g., facing oncoming traffic) and lights 110, 112, and 114 facing toward from the vehicle perspective (e.g., facing the vehicle). There may also be traffic signs 116 and 118 configured in the environment. Vehicles 120, 122, and 124 may also be configured in the environment along with a pedestrian 126. The environment of example 104 may include a drivable region 128 (e.g., roadway) and a non-drivable region 130 (e.g., a median).

At operation 132, the vehicle computing system may determine one or more representations (e.g., two-dimensional images) of the portion of the environment associated with the sensor data received at operation 102. In some examples, the vehicle computing system may receive such images with the sensor data at operation 102. For example, such images may be included as or based on logging or mapping data (or with data representing a fusion or combination of these). Alternatively or additionally, the vehicle computing system may generate or otherwise determine such images and/or other representations based on the sensor data received at operation 102.

Further at operation 132, the vehicle computing system may determine one or more labels for individual features, objects, regions, segmentations, and/or other detections represented in such images or other data received at operation 102. Examples of such labels may include object labels (e.g., vehicle, bicycle, pedestrian, dog, bird, obstacle, etc.) and region labels (e.g., drivable region, non-drivable region, construction zone, etc.). For example, such labels may be included with logging or mapping data (or with data representing a fusion or combination of these) and the vehicle computing system may identify or otherwise determine such labels from the data received. In examples, the data received at operation 102 may include traffic light labels, traffic sign labels, traffic lane labels, and/or light/lane association labels.

Alternatively or additionally, the vehicle computing system may generate or otherwise assign labels for the individual features, objects, regions, segmentations, and/or other detections represented in the images or other data received at operation 102. For instance, the vehicle computing system may execute one or more classification components to determine labels for images and/or other data received at operation 102. The vehicle computing system may use mapping, logging, and/or combined or fused mapping and logging data to determine such labels. The vehicle computing system may then assign these one or more labels to such detections and/or otherwise associate label data with such detections.

In various examples, the images processed by the vehicle computing system may include a number of discrete pixels. The vehicle computing system may determine a detection associated with individual pixels and may then determine (e.g., identify or generate) one or more labels for such individual pixels based on the associated detection. The vehicle computing system may then associate such labels with the individual pixels. For example, the individual pixels associated with a drivable roadway may be individually assigned a drivable region label. Similarly, the individual pixels associated with a vehicle may be individually assigned a vehicle object label. In some examples, an individual pixel may be associated with a single label. In other examples, an individual pixel may be associated with multiple labels. For example, a pixel that is associated with a vehicle configured on a drivable roadway may be assigned a drivable region label and a vehicle label. The vehicle computing system may use such labels to determine labels for individual pixels for a labeled output image as described herein.

At operation 134, the vehicle computing system may determine pixels in the images or other received data that are associated with traffic light, traffic signs, and/or traffic lanes. For example, the vehicle computing system may identify those pixels in an image that are associated with one of these types of labels and filter other labels from the image to generate an intermediate light and lane labeled image that may include (e.g., only) traffic light, traffic sign, and/or traffic lane labels for (e.g., a subset of) pixels in the image. The intended output of the process 100 may be one or more images or other data with light/lane association labels (e.g., only). Therefore, this intermediate light and lane labeled image may provide a basis for the output image ultimately determined by this process.

An example 136 illustrates an example image with traffic light, sign, and lane pixel labeling based on sensor data collected from the environment represented in example 104. In this example, the vehicle computing system has determined from the sensor data that the groups of pixels 138, 140, and 142 are associated with traffic lights, the groups of pixels 144 and 146 are associated with traffic signs. The vehicle computing system has further detected the groups of pixels 148 and 150 are associated with traffic lanes in the environment.

At operation 152, the vehicle computing system may determine associations between traffic lights and/or signs and traffic lanes. For example, the vehicle computing system may determine one or more particular lanes that are associated with one or more particular traffic lights (e.g., the lights that are intended to control the traffic in associated lanes). The computing system may also, or instead, determine one or more particular lanes that are associated with one or more particular traffic signs (e.g., the lights that are intended to control the traffic in associated lanes). In examples, the system may determine one or more traffic lights and one or traffic more signs (e.g., both a light and a sign) that are both associated with one or more particular lanes. In examples, the vehicle computing system may determine these associations based on other data that may be available (e.g., as received in operation 102). For example, mapping and/or logging data (or some combination thereof) may be used to determine associations between lanes and lights and/or signs. The system may also or instead use label data (light/lane association labels and/or other types of labels) to determine associations between lanes and lights and/or signs. In various examples, at operation 152 the system may determine a probability of association for individual pixels. For example, the system may determine a probability that a particular pixel is associated with a combination of a traffic light and a traffic lane.

In various examples, the vehicle computing system may use a temporal sequence of images to determine light/lane associations. For example, the system may determine, based on a sequence of images, that a particular pattern of traffic corresponds to a particular light (e.g., condition of the light (red, green, etc.)), and, based on that correspondence, determine a particular lane is associated with that light.

At operation 154, the vehicle computing system may label those pixels that are associated with a light/lane association with a corresponding label. In various examples, each unique light/sign and lane association may have a corresponding unique light/lane label. In this way, particular combinations of lights and lanes in an environment may be distinguishable by other (e.g., downstream) components of the vehicle computing system. Light/lane labels may be distinguished from one another by label identifiers, attributes, and/or any other characteristics that may be used distinguish labels.

The vehicle computing system may use a light/lane association label probability threshold as a threshold criteria for determining whether to assign a light/lane association label to a pixel. For instance, the system may first determine a probability that a particular pixel is associated with a combination of a traffic light and a traffic lane. The system may then determine if that probability meets or exceeds a probability threshold for label assignment (e.g., 75% probability, 90% probability, etc.). If so, the system may assign a specific light/lane association label to that pixel in the output image. Otherwise, the system may not assign any label to that pixel in the output image. In examples, this thresholding operation may be performed within the model and the model may generate an output of labels determined based on the thresholding, but in other examples the model may output the probabilities for the label assignments and a thresholding operation may be performed by one or more system downstream from the model based on the probability data represented in the model output.

An example 156 illustrates an example image with light/lane association labeled bounding regions encapsulating pixels labeled with particular light/lane labels based on the image of example 136 representing the environment shown in example 104. In this example, the vehicle computing system has determined that the bounding regions 158 includes pixels representing the association of the lane pixels 148 and the light pixels 138 of example 136. The vehicle computing system has also determined that the bounding region 160 includes pixels representing the association of the lane pixels 150 and the light pixels 140 and 142 of example 136. Each of the pixels in the bounding regions 158 and 160 may have a relatively unique label. That is, the individual labels for the pixels in the regions 158 may be the same across such pixels, but different than the individual labels for the pixels in the region 160, to allow pixels in the two regions (and therefore the two light/lane associations) to be distinguishable based on their respective labels. As described herein, multiple lanes may be associated with one or more lights and multiple lights may be associated with one or more lanes (e.g., associated with a particular light/lane label). In this example, the pixels 140 and 142 associated with the two lights 112 and 114, respectively, are associated with the pixels 150 of the straight lane. All these pixels are assigned the same light/lane label for the region 160. The lane/traffic control association labels described herein may be used by further downstream components such as other portions of perception that may be used to detect a state of traffic control device or person or by prediction to determine how objects are likely to move in the future, for example. They may also be used by a planner to determine how an autonomous vehicle may move in the future.

At operation 162, the vehicle computing system may generate or otherwise provide output images based on the label determinations performed at operation 154. The vehicle computing system may also, or instead, generate additional data and/or generate a dataset (e.g. including one or more multichannel data structures) based on and/or including a subset of the data received at operation 102. Such output images may include pixels that may be labeled as light/lane association pixels and pixels that may be labeled as other types of detections. In some examples, individual pixels in this output image may be assigned light/lane association labels or no label, while in other examples, individual pixels in the output image may be associated with one or more other types of labels. These output images may be two-dimensional perspective images and/or top-down perspective images.

These images provided may be provided to one or more other systems (e.g., vehicle computing system components) for use in controlling the vehicle. Alternatively or additionally, such output images may be used to train a machine-learning model. For example, a signal may be generated or otherwise output that includes the output resulting from the process 100 as training data to a machine-learned model training system to train a machine-learned model to perform light/lane association detections and labeling and/or other detections and/or labeling operations.

In various examples, one or more operations of the process 100 may be omitted and/or other operations may be included in the process 100 that may not be explicitly described herein. All such implementations are contemplated as within the scope of the instant disclosure.

Figure 2:
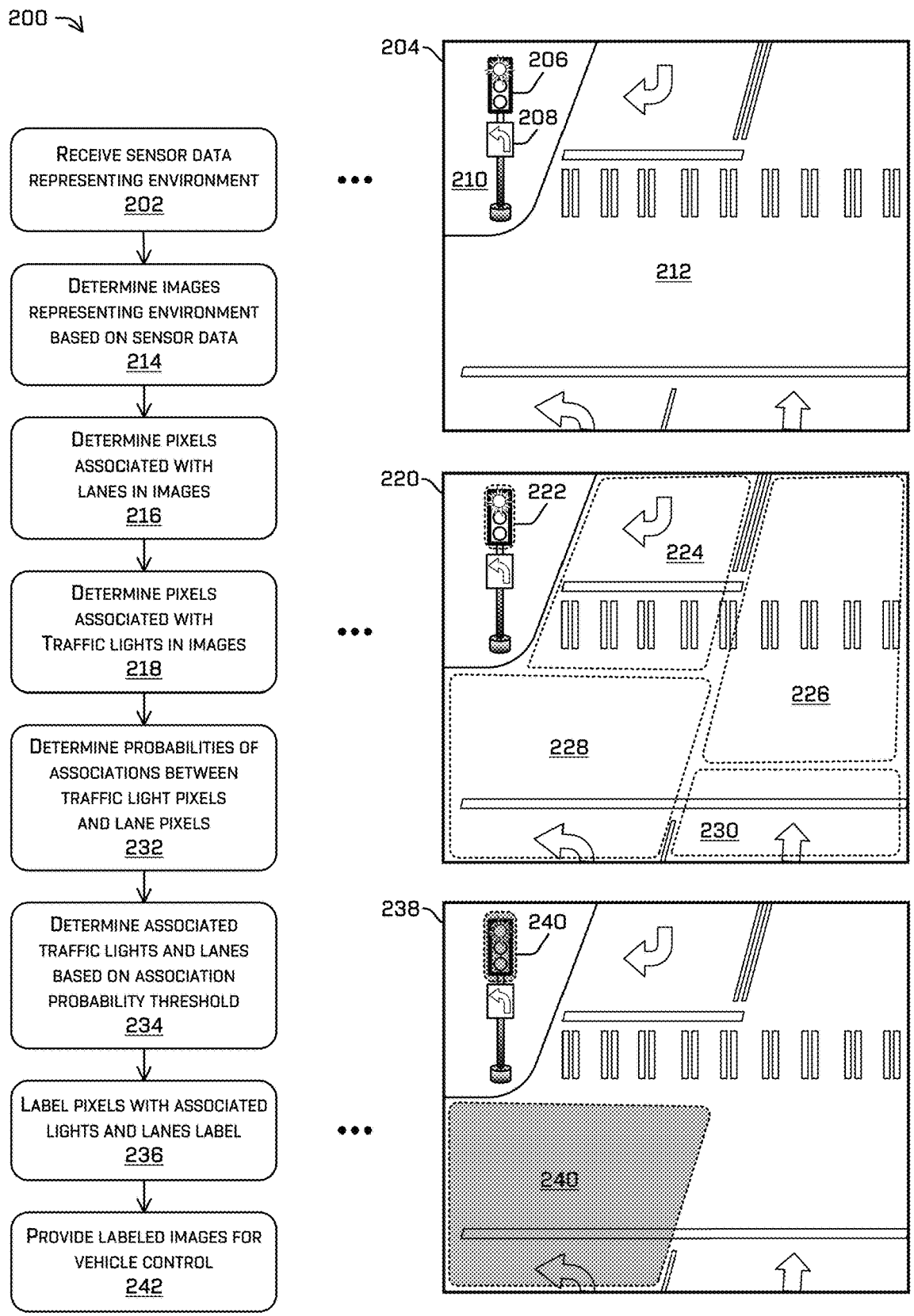
FIG. 2 is a pictorial flow diagram of another example process for determining traffic light and lane association classifications for image data, in accordance with examples of the disclosure.

FIG. 2 is a pictorial flow diagram of an example process 200 for detecting and labeling light/lane associations in an environment in which a vehicle may be operating and/or for determining training data that may be used to train a machine-learned model to detect and label light/lane associations. In some examples, one or more operations of the process 200 may be implemented by a vehicle computing system, such as by using one or more of the components and systems illustrated in FIGS. 3-5 and described below.

For example, one or more components and systems can include those associated with one or more of the trained traffic light and lane association classification system 320, the classifier 322, the classifier(s) 408, the classification component 524, the traffic light and lane association classification component 526, one or more sensor systems 404 and 506, one or more of the perception components 324, 406, and 522, and/or one or more of the planning components 334, 418, and 528. In some examples, the one or more operations of the process 200 may also, or instead, be performed by a remote system that may be in communication with a vehicle, such as the classification component 546, the traffic light and lane association classification components 548, the perception component 544, and/or the planning component 550 of the computing device(s) 538 illustrated in FIG. 5. In some examples, the one or more operations of the process 200 may also, or instead, be performed by a remote system that may be configured to train a machine-learned model, such as the traffic light and lane association classification model training system 552 illustrated in FIG. 5. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing systems. However, the process 200 is not limited to being performed by such components and systems, and the components and systems of FIGS. 3-5 are not limited to performing the process 200.

At operation 202, data representing an environment in which a vehicle may be traveling may be received at a vehicle computing system or other computing system. For example, the system performing the operations of process 200 may be one or more components of a vehicle computing system configured at an operational autonomous vehicle and configured to execute a machine-learned model that has been trained to detect and label light/lane associations. Alternatively, the system performing the operations of process 200 may be a system configure to train one or more such machine-learned models and/or to generate training data for use in training such machine-learned models.

In examples, the data received at operation 202 may include one or more types of sensor data associated with one or more types of sensor systems, including, but not limited to, vision data associated with a vision system, lidar data associated with a lidar system, radar data associated with a radar system, sonar data associated with a sonar system, etc. In some examples, data may be received from a sensor system remote from a vehicle (e.g., a stationary sensor, another vehicle, etc.). In various examples, the data received at operation 202 may also, or instead, include two-dimensional representations of a portion of an environment determined based on sensor data and associated with a particular sensor perspective, such as two-dimensional sensor perspective images. For example, such two-dimensional representations may include images or scenes captures by a camera configured at a vehicle, although of course any two-dimensional representation of an environment described herein that may be associated with any sensor perspective and may be generated or otherwise determined using any type of sensor data and/or any combination of multiple types of sensor data are contemplated. As noted above, any such representation may be referred to herein as an "image."

The data received at operation 202 may further include three-dimensional data representing an environment. For example, such data may include one or more representations of the three-dimensional space in an environment that may be "voxelized" by uniformly dividing the space into three-dimensional cubes ("voxels") representing sections of that portion of the space. The data received at operation 202 may include one or more multichannel data structure that may have multiple (e.g., two, three, four, or more) sensor channels with data associated with any one or more sensor types and/or other types of data, any of which may be associated with one or more particular pixels and/or voxels.

In various examples, the data received at operation 202 may include label data. For example, the images received may include images with labeled pixels. In such examples, these labels may or may not include light/lane association labels. In other examples, the data received at operation 202 may also, or instead, include unlabeled and/or raw images. In some examples, the data received at operation 202 may also, or instead, include labeled three-dimensional data that may include voxels and labels associated with individual or groups of voxels. The data and/or labels received at operation 202 may be based on any type of sensor data.

In various examples, the data received at operation 202 may also, or instead, include mapping data and/or logging data. In various examples, the data received at operation 102 may be a combination or fusion of mapping, logging, and/or sensor data into a dataset of one or more data structures. For example, mapping data and/or logging data collected and/or generated by one or more vehicles traversing the environment may be received, for example, with sensor data, at operation 102. This mapping and/or logging data may include one or more labels associated with one or more pixels or other data structures represented in such data. Such labels may include one or more light/lane labels indicating associated traffic lights and lanes and/or traffic signs and lanes and/or other types of labels, such as object labels, region labels, etc. Labels in such data may be generated or otherwise determined by one or more components (e.g., classification components) of a perception system configured at one or more vehicles traversing the environment, for example as described herein.

An example 204 illustrates a two-dimensional sensor perspective view of a portion of an environment that may be represented by two-dimensional, three-dimensional, and/or other data, such as that received at operation 202. This example perspective view of the environment may represent a view from the perspective of a sensor configured on a vehicle. In this example, the perspective of the sensor may extend outward from the vehicle at which the sensor is configured, and therefore the vehicle at which the sensor is configured may not be captured in the example view 204. In the portion of the environment illustrated in example 204, detections may be represented that may include a traffic light 206 and a traffic sign 208. A non-drivable region 210 (e.g., sidewalk) may be present in the environment as well as a drivable region 208 (e.g., roadway). In this example, these objects, features, and regions may be labeled in received data (e.g., at operation 202). Alternatively or additionally, a vehicle computing system may determine one or more labels for such detections using such received data. Alternatively or additionally, these objects, features, and regions may be represented in raw data (e.g., at operation 202) that may be processed in process 200.

At operation 214, the vehicle computing system may determine one or more representations (e.g., two-dimensional images based on vision data) of the portion of the environment associated with the sensor data received at operation 202. In some examples, the vehicle computing system may receive such images with the sensor data at operation 202. Alternatively or additionally, the vehicle computing system may generate or otherwise determine such images and/or other representations based on the sensor data received at operation 202.

The images received at operation 202, or determined based on such data, may include a number of discrete pixels. The vehicle computing system may determine a detection associated with individual pixels. For example, at operation 216, the vehicle computing system may determine one or more pixels represented in an image that may be associated with one or more lanes of traffic in the environment. At operation 218, the vehicle computing system may also, or instead, determine one or more pixels represented in an image that may be associated with one or more traffic lights and/or traffic signs in the environment. The vehicle computing system may perform this determination using mapping data, logging data, and/or a combination thereof as described herein. Alternatively or additionally, the vehicle computing system may use three-dimensional data received at operation 202 may include one or more labels indicating portions of three-dimensional space in the environment that may be associated with lights, signs, or lanes or have a relatively high probability of being associated with lights, signs, or lanes. For example, individual voxels included in such data may be associated with one or more labels, one of which may be a light, sign, or lane label. Alternatively or additionally, the vehicle computing system may use received data (three-dimensional data, two-dimensional data, and/or any other data) representing the environment to determine portions of the environment that may be associated with lights, signs, or lanes. For example, the system may receive or obtain manually determined light, sign, or lane labeled data resulting from one or more other operations.

An example 220 illustrates an example image with a traffic light a lane regions determined in the environment represented in example 204. In this example, the vehicle computing system has determined from the sensor data that the group of pixels 222 is associated with a traffic light, while the groups of pixels 224, 226, 228, and 230 are associated with traffic lanes in the environment.

At operation 232, the vehicle computing system may determine, for individual pixels in one or more images, a probability that a respective pixel is associated with a particular light/lane association. For example, pixels that represent a portion of a lane that is determined to likely be associated with a particular traffic light may have a high probability of being associated with a light/lane association that includes that traffic light, while pixels that represent a portion of the environment that does not include a light or a lane may have a very low probability of being associated with any light/lane association. In examples, there may be multiple potential light/lane associations in an image. In such examples, the vehicle computing system may determine, for individual pixels, a probability that that pixel is associated with an individual potential light/lane associations, resulting in multiple light/lane association probabilities per pixel.

Such probabilities may be based on determining similarities between pixels that may potentially be associated with one another based on a light/lane association. For example, the system may determine whether and/or to what extent one or more attributes or properties of a particular pixel is similar to a corresponding one or more attributes or properties of another particular pixel. For instance, vectors or signatures of two pixels may be compared and, if the signatures are sufficiently similar (e.g., substantially match), the pixels may be determined to be associated with a same light/lane association. This may be accomplished by a similarity score (e.g., a cosine similarity), clustering, or other known techniques in parameter space to determine a degree of similarity. In other words proximity or similarity of parameters of pixels may be used to gauge an association between pixels and a corresponding label as disclosed herein.

At operation 234, the vehicle computer system may determine whether one or more of the probabilities of potential light/lane associations for individual pixels in one or more images meet or exceed a threshold probability. For those probabilities that meet or exceed such a threshold, the vehicle computing system may assign a corresponding light/lane association label to that pixel at operation 236. While in many examples only one probability among the multiple probabilities that may be associated with a pixel may meet or exceed this a probability threshold, in some examples, if two or more probabilities associated with a pixel meet or exceed a threshold, the vehicle computing system may assign the label associated with the highest probability light/lane association to that pixel at operation 236.

An example 238 illustrates a two-dimensional image representing the sensor perspective view of the portion of the environment shown in the previous examples 204 and 220. In this example, the vehicle computing system may have determined that the light 222 and the left turn lane 228 of example 220 are associated with one another (e.g., the light 222 is intended to control traffic travelling in the lane 228). The portions of the image that are associated with the light 222 and the left turn lane 228 of example 220 may therefore be assigned the label 240 as shown in the example 238. In some examples, as shown in the example 238, multiple distinct and separate pixel regions of an image may be labeled with a same light/lane association label. In this example, there are two regions labeled with label 240, one including the light 222 and one including the lane 228.

At operation 242, the vehicle computing system may provide a labeled image that includes one or more light/lane association labeled pixels for vehicle control. In examples, operation 242 may include determining between an image labeled by an executing machine-learned model trained to determine light/lane associations and one or more other images (e.g., labeled by one or more other models and/or systems). For example, a vehicle computing system may also (e.g., concurrently with a light/lane association machine-learned model) execute a mapping machine-learned model that uses mapping data collected in the environment to determine light and/or lane labels from images. The mapping data may provide features of an environment such as lane positions, traffic light positions, etc. This mapping data may, at time, be inaccurate due to the age of the mapping data, noisy, and/or may have other issues that may affect the accuracy of the mapping model's labeling or due to temporary conditions in the environment (e.g., construction, a power outage, etc.). At operation 242, the system may determine which output to use from among the output of the light/lane association machine-learned model and the mapping machine-learned model based on one or more criteria (e.g., noisiness of mapping model output, age of mapping data, identification of a features in the environment indicative of a temporary condition, such as construction signs/cones, etc.).

The system may also, or instead, compare the output of these two (or other) models to determine if they correspond. For example, if the output of both the light/lane association machine-learned model and the mapping machine-learned model indicate a similar light and/or lane classification for a particular pixel, the vehicle computing system may select the output of one or the other (e.g., mapping model output) by default for use in vehicle control. However, if the output of the light/lane association machine-learned model and the mapping machine-learned model differ (e.g., a particular pixel is labeled a light/lane pixel by the light/lane association machine-learned model but labeled as something unrelated (or not labeled) by the mapping machine-learned model, the vehicle computing system may select the output of one or the other (e.g., light/lane association machine-learned model output) based on this difference for use in vehicle control. For example, the vehicle computing system may use the dynamically determined (e.g., based on currently determined sensor data) labeling of the light/lane association machine-learned model over the mapping machine-learned model because the mapping data used by the mapping machine-learned model may potentially not align with the environment. In examples, each machine-learned model may output a corresponding confidence score for a pixel/label pair, per label, etc.

For example, a construction zone may have been configured in an environment to facilitate road construction. In this zone, the configuration of lanes and traffic control objects may have changed since mapping data available to a vehicle computing system was collected. For instance, three lanes may have been reduced to two, with stops signs put into place and a human traffic controller (e.g., flagger, police personnel, etc.) directing traffic into the two lanes where the road narrows from three lanes in the construction zone. The mapping machine-learned model may not accurately identify the pixels that are associated with this construction zone configured and its associated lanes and control objects, but the light/lane association machine-learned model may more accurately identify associated lanes and traffic control objects based on its training. In this situation, the vehicle computing system may be configured to use the labeling determined by the light/lane association machine-learned model because such labeling is determining solely on current detections based on current sensor data instead of the historical and possibly out-of-date data on which the mapping machine-learned model may rely.

In another example, the system may also, or instead, defer to one model over another based on a third model. For example, a vehicle computing system may execute a construction zone detection model. If the construction zone detection model indicates (e.g., via pixel labeling) that there is a construction zone in the environment in which the vehicle is currently traveling, the vehicle computing system may be configured to use the labeling determined by the light/lane association machine-learned model because its labeling is based on current data. On the other hand, if the construction zone detection model indicates (e.g., via pixel labeling) that there is no construction zone in the environment in which the vehicle is currently traveling, the vehicle computing system may be configured to use the labeling determined by the mapping machine-learned model because its labeling may be more detailed and accurate if the mapping data is up-to-date.

Other models may be used a similar manner. For example, a vehicle computing system may execute one or more models trained to detect abnormal or unusual conditions that involve special road conditions, such as sporting events, car accidents, emergency situations, emergency vehicles, emergency personnel, etc. The vehicle computing system may use the output of one or more such models to determine whether and/or how to use the output of a light/lane association machine-learned model. In various examples, these models may be executed concurrently, while in other examples, one or more such models may be executed conditionally. For example, the light/lane association machine-learned model may be executed only when a construction zone model or an abnormal condition model determines that unusual road conditions are present.

In various examples, the determination of one model over one or more others for use for providing output that may be used to control a vehicle may be based on a confidence score or probability associated with such models. For example, the vehicle computing system may determine that a mapping machine-learned model has a relatively high confidence score (e.g., due to very current mapping data) while a light/lane association machine-learned model has a lower confidence score (e.g., due to sensor issues and rainy/smokey environment). In this case, the vehicle computing system may determine to use the output of the mapping machine-learned model over that of the light/lane association machine-learned model for vehicle control. Alternatively, the vehicle computing system may determine that a mapping machine-learned model has a relatively low confidence score (e.g., due to dated mapping data) while a light/lane association machine-learned model has a higher confidence score (e.g., due to high resolution sensors and a clear view). In this case, the vehicle computing system may determine to use the output of the light/lane association machine-learned model over that of the mapping association machine-learned model for vehicle control. Such confidence scores and/or probabilities may be used with any number of models of any type that may be executed at a vehicle computing system to perform a hierarchical model output determination operation to determine output to be used in vehicle control.

In various examples, a light/lane association labeled image may be provided to a trajectory determination system for use in determining a trajectory or corridor of travel for the vehicle, as described herein. For example, using a light/lane association labeled image, the vehicle computing system may determine whether the vehicle is planning or predicated to travel in a lane associated with a particular a light/lane association and, if so, determine the condition of the light associated with the particular a light/lane association (e.g., green, red, etc.) to determine how to control the vehicle while traveling in that lane. These output images may be two-dimensional perspective images and/or top-down perspective images.

In various examples, one or more operations of the process 200 may be omitted and/or other operations may be included in the process 200 that may not be explicitly described herein. All such implementations are contemplated as within the scope of the instant disclosure.

FIG. 3 is a block diagram of an example detection and labeling system 300 according to various examples. The system 300 may include a traffic light and lane association classification model training system 304 and a vehicle computing system 326 that may execute one or more models trained by the traffic light and lane association classification model training system 304. The vehicle computing system 326 and/or one or more of its component may be configured at a vehicle (e.g., and autonomous vehicle). The traffic light and lane association classification model training system 304 may be implement at a vehicle computing system and/or at a remote system. The system 300 may include one or more of the components and systems illustrated in FIGS. 4 and 5 described below. Alternatively, or in addition, the system 300 may be implemented at a training data generation system and/or a machine-learned model training system.

For example, one or more components and systems can include those associated with one or more of the one or more sensor systems 404 and 506, one or more of the perception components 406 and 522, the classifier(s) 408, the traffic light and lane association classification component 526, one or more sensor systems 404 and 506, one or more of the perception components 406 and 522, and/or one or more of the planning components 418 and 528. In some examples, the one or more components of the system 300 may also, or instead, be implemented at a remote system in communication with a vehicle, such as the construction zone classification model training system 552, the classification component 546, the traffic light and lane association classification components 548, the perception component 544 and/or the planning component 550 of the computing device(s) 538 illustrated in FIG. 5. In still other examples, one or more operations of the system 300 may be implemented as a combination of a components at a remote system and a vehicle computing system. However, the system 300 is not limited to being performed by such components and systems, and the components and systems of FIGS. 4 and 5 are not limited to implementing the system 300.

Training data 302 may be generated, determined, received, and/or provided to the traffic light and lane association classification model training system 304. In various examples, the training data 302 may include sensor data may be associated with data collected and/or generated by one or more sensors configured on a vehicle that may be traveling through an environment. Training data 302 may include lidar data, radar data, sonar data, vision data, infrared data, ultrasonic data, time-of-flight data, etc. Training data 302 may also, or instead, include any type of two-dimensional data and/or three-dimensional date that may be associated with an environment. For example, training data 302 may include one or more images of one or more portions of an environment (e.g., based on any type of sensor data). Training data 302 may also, or instead, include three-dimensional data associated with an environment that includes and/or may be used to determine three-dimensional light/lane association data. Training data 302 may further include labels and/or labeling information that may be associated with two-dimensional data (e.g., pixels) and/or three-dimensional data (e.g., voxels). Training data 302 may include one or more multichannel data structures with individual channels representing data associated with a particular type of sensor or particular sensor system (e.g., vision, lidar, radar, sonar, time-of-flight, etc.) and/or one or more other types of data.

The training data 302 may be provided to the traffic light and lane association classification model training system 304 that may be configured with a machine learning model architecture 306 (e.g., that may include one or more neural networks of any type and/or any other machine learning model components) that may be configured to train a traffic light and lane association classification system 318 to detect objects, regions, features, etc. in an environment and determine appropriate labeling and/or classifications for such detections for various types of data. For example, the traffic light and lane association classification system 318 may be trained to detect and label pixels in two-dimensional images and/or may label portions of two-dimensional representations of an environment. In particular, the traffic light and lane association classification system 318 may be trained to detect and/or segment light/lane associations and assign light/lane associations labels accordingly.

In various examples, the traffic light and lane association classification model training system 304 may transmit or otherwise provide a trained traffic light and lane association classification system 320 to a classifier 322 configured at a perception component 324 of the vehicle computing system 326. The vehicle computing system 326 may be deployed to an operational environment and may autonomously traverse such an environment. While operating in an environment, the perception component of the vehicle computing system 326 may execute the classifier 322 to detect and label objects in the environment based on data received from the vehicle's sensor system(s) 328. In examples, the classifier 322 may detect and label lands and associated lights and/or signs using the trained traffic light and lane association classification system 320.

The labeled data generated or otherwise determined by the classifier 322, including light/lane association labeled data determined by the trained traffic light and lane association classification system 320, may be provided to other components of the vehicle computing system 326 for controlling the vehicle. For example, one or more of the top-down segmentation component 330, the prediction component 332, and the planning component 334 may use the labeled data generated or otherwise determined by the classifier 322, including, in examples, light/lane association labeled data determined by the trained traffic light and lane association classification system 320. One or more of these components may also use mapping data from a mapping component 336, as well other data from other components and/or data sources (e.g., as described herein).

In various examples, the trained traffic light and lane association classification system 320 may generate or determine a light/lane association labeled image. These images may be provided to a classifier 322, for example, along with other labeled images from other classification systems, that may determine a single image based on such images using pixel label comparison and/or intersection operations as described herein to determine a single label for the individual pixels in an output image or other output data that may be provided to components such as the top-down segmentation component 330, the prediction component 332, and the planning component 334.

The trained traffic light and lane association classification system 320 and one or more other classification systems and/or models may be integrated into a single machine-learned model executed by a CNN. Alternatively, these components may include independently executed models, the outputs of which may be provided to one or more other models and/or other components to perform the operations described herein.

In various examples, the top-down segmentation component 330 may use, at least in part, light/lane association labeled data from the trained traffic light and lane association classification system 320 to generate a top-down segmented representation of an environment that includes indications of one or more light/lane associations determined by the trained traffic light and lane association classification system 320. The top-down segmentation component 330 may use two-dimensional image data from the trained traffic light and lane association classification system 320 to determine segment data for a two-dimensional top-down representation of the environment. In some examples, the top-down segmentation component 330 may determine labels for segments in a top-down representation of the environment based on the output from the trained traffic light and lane association classification system 320. In various examples, the top-down segmentation component 330 may represent such segments as connected cells in a top-down two-dimensional grid representation of the environment based, at least in part, on the output from the trained traffic light and lane association classification system 320. This top-down segmented representation may be used by the prediction component 332, the planning component 334, and/or by one or more other components configured at the vehicle computing system 326 to more accurately predict object trajectories and plan vehicle routes and trajectories, which in turn may increase the safety and efficiency of vehicle operation.

The output of the trained traffic light and lane association classification system 320 may be provided to one or more other systems or components for use in other operations, including in combination with other types of data (e.g., using one or more data fusion operations with one or more other images). For example, the output of the trained traffic light and lane association classification system 320 may be used to determine tracking data for objects in an environment and/or the vehicle itself. In various examples, the vehicle computing system 326 may use the output of the trained traffic light and lane association classification system 320 to control a vehicle. For example, the vehicle computing system 326 may determine to slow down the vehicle when approaching traffic light that is associated with a lane in which the vehicle is currently located and represented in the output of the trained traffic light and lane association classification system 320 as a light/lane association. In another example, the vehicle computing system 326 may determine a trajectory to control the vehicle into another lane and/or to avoid a particular lane based on the output of the trained traffic light and lane association classification system 320 and the light/lane associations indicated therein.

The output of the output of the trained traffic light and lane association classification system 320 may also, or instead, be provided to one or more other systems or components as training data for training a machine-learned model to, for example, detect traffic lights and/or signs and associated traffic lanes and label two-dimensional images.

Figure 4A:
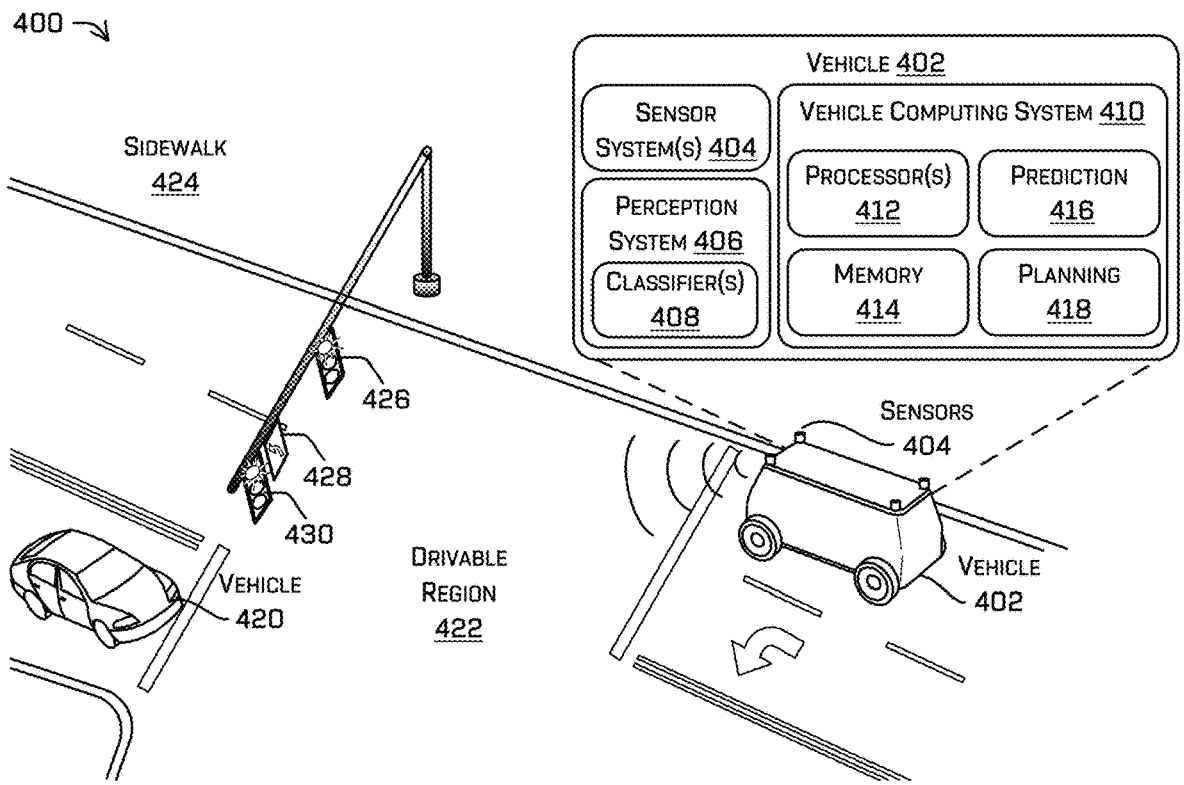
FIG. 4A is a diagram of an example environment in which a vehicle may encounter a traffic lights and traffic signs, in accordance with examples of the disclosure.
Figure 4B:
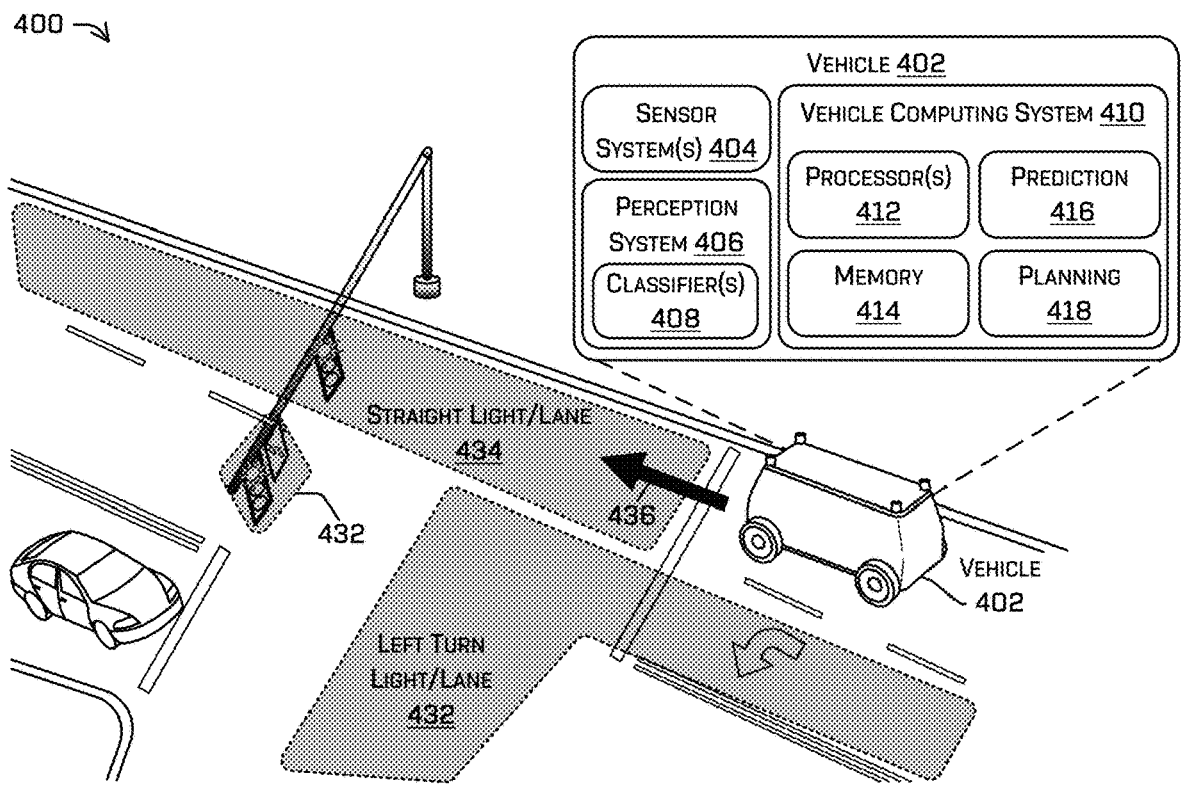
FIG. 4B is a diagram of the example environment of FIG. 4A in which the vehicle may determine a classification for associated traffic lights and lanes in the environment for purposes of navigating the vehicle through the environment, in accordance with examples of the disclosure.

FIG. 4A is a perspective view of an example environment 400 in which a vehicle 402 may be traveling. The vehicle 402 may be configured with one or more sensor systems 404 that may include any one or more sensor of any type (e.g. lidar, radar, sonar, vision, time-of-flight, ultrasonic, infrared, etc.). The vehicle 402 may also be configured with a perception system 406 that may receive sensor data from the sensor system(s) 404. The perception system 406 may perform detection and/or labeling operations using such sensor data. The perception system 406 may include one or more classifiers 408 that may include a traffic light and lane association classification component that may perform operations as described herein and one or more other classification components (e.g., feature classification components and/or other classification components). The vehicle 402 may further be configured with a vehicle computing system 410 that may include one or more processors 412, a memory 414, a prediction component 416, and a planning component 418, any one or more of which may be used to perform, or in conjunction with the performance of, one or more of the operations described herein.

The environment 400 may include a drivable region 422 on which the vehicle 402 may be traveling along with another vehicle 420. The sidewalk 424 may also be present in the entwinement 400, representing a non-drivable region. The environment 40 may further include traffic lights 426 and 430, as well as a traffic sign 428. The sensor system(s) 404 may collect data from the environment 400 (e.g., by receiving or otherwise sensing reflected and/or emitted electromagnetic waves in the environment 400) and generate sensor data that the sensor system(s) 404 may provide to the perception system 406. This sensor data may take the form of two-dimensional data and/or three-dimensional data representing and/or otherwise associated with the environment 400. In examples, the sensor data may include two-dimensional images of portions of the environment from a sensor perspective.

The perception system 406 and/or the classifier(s) 408 may include one or more machine-learned models that may have been trained to perform detection and labeling, including light/lane association detection and labeling, for example as disclosed herein. The perception system 406 and/or the classifier(s) 408 may execute a classification machine-learned model(s) to perform classification and labeling operations as described herein to determine one or more classifications for the objects, regions, and features in the environment 400. For example, perception system 406 and/or the classifier(s) 408 may detect the vehicle 420, lights 426 and 430, and sign 428, and determine one or more labels for such detections.

In various examples, as described herein, the perception system 406 and/or the classifier(s) 408 may determine whether to label these detections as being associated with a light/lane association (e.g., using a traffic light and lane detection and classification model). The perception system 406 and/or the classifier(s) 408 may also determine other labels and detections (e.g., using one or more feature classification models or other classification models). The perception system 406 and/or the classifier(s) 408 may generate the results of these determinations as separate images with a single label per image pixel (e.g., a light/lane association labeled image and a one or more images for one or more other label types) and/or as a single image with multiple possible labels per image pixel. The perception system 406 and/or the classifier(s) 408 may then intersect the labels or otherwise determine a label for the individual pixels of an output image using label comparisons and/or one or more criteria. For example, the perception system 406 and/or the classifier(s) 408 may use a hierarchical system of label significance to determine the appropriate labels for the output image pixels.

The output image and associated labels determined by the perception system 406 may be used by the vehicle computing system 410 to perform vehicle control operations. For example and referring now to FIG. 4B providing another perspective view of the example environment 400, the perception system 406 may have detected that the light 426 is associated with a straight lane and labeled the corresponding pixels associated with this combination with the straight light/lane label 434. The perception system 406 may have also detected that the light 430 and/or the sign 428 is associated with a left turn lane and labeled the corresponding pixels associated with this combination with the left turn light/lane association label 432. Using these labeled detections, the vehicle computing system 410 may control the vehicle within the drivable region 422 along the straight lane associated with the light 426 in the direction 436.

For example, the vehicle computing system 410 may use the planning component 418 to determine a trajectory for the vehicle 402 based on the light/lane association 434 determined using the classifier(s) 408 and/or the perception system 406. For example, the planning component may generate a trajectory that controls the vehicle in the direction 436 in the straight lane (e.g., based on the condition of the light 426). The vehicle computing system 410 may have determined that, according to its current trajectory and/or route, the vehicle 402 should not turn left and therefore may control the vehicle to avoid the left turn light/lane association region 432.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 that may include a classification component 524 and/or a traffic light and lane association classification component 526 that may be configured to perform one or more of the light/lane association detection and labeling operations and/or machine-learned model training operations described herein, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the classification component 524, the traffic light and lane association classification component 526, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, traffic light and lane association detection and labeling and machine-learned model training operations as described herein. For example, the perception component may include functionality to analyze sensor data to determine whether to label pixels in images as light/lane association pixels, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, unknown).

In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the voxel data structures generated and two-dimensional sensor data, to generate processed sensor data, which may take the form of two-dimensional images in some examples. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a multichannel data structure, a two-dimensional grid of cells containing data, a two-dimensional representation of a portion of an environment from a sensor perspective, a two-dimensional image, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment and can be loaded into working memory as needed. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses as described herein to generate one or more predicted trajectories for various mobile objects in an environment. In some examples, the prediction component 534 may be a sub-component of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers. Such a CNN may be a component of and/or interact with the classification component 524 and/or the traffic light and lane association classification component 526.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data, including data described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., images, labeled images) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550 and/or a perception component 544 that may include a classification component 546 and/or a traffic light and lane association classification component 548 that may be configured to perform one or more of the light/lane association detection and labeling operations and/or machine-learned model training operations described herein. In some instances, the perception component 544 can substantially correspond to the perception component 522 and can include substantially similar functionality. In some instances, the classification component 546 can substantially correspond to the classification component 524 and can include substantially similar functionality. In some instances, the traffic light and lane association classification component 548 can substantially correspond to the traffic light and lane association classification component 526 and can include substantially similar functionality. In some instances, the planning component 550 can substantially correspond to the planning component 528 and can include substantially similar functionality. The memory 542 may also store a traffic light and lane association classification model training system 552 that may be configured to perform one or more of the light/lane association detection and labeling operations and/or machine-learned model training operations described herein.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

Example Clauses

The following paragraphs describe various examples. Any of the examples in this section may be used with any other of the examples in this section and/or any of the other examples described herein.

A: A system comprising: one or more processors; and one or more non-transitory computer-readable media storing instructions executable by the one or more processors, wherein the instructions, when executed, cause the system to perform operations comprising: receiving vision data associated with a vehicle traversing an environment; determining, based at least in part on the vision data, a two-dimensional sensor perspective image representing a portion of the environment; determining, by a first machine-learned (ML) model, based at least in part on the two-dimensional sensor perspective image, a first image comprising a traffic light and traffic lane association label for a first pixel and a second pixel of the two-dimensional sensor perspective image, wherein: the first pixel represents at least a portion of a traffic light in the environment; the second pixel represents at least a portion of a traffic lane in the environment; and the traffic light and traffic lane association label indicates that the first pixel is associated with the second pixel; determining, by a second ML model, based at least in part on mapping data associated with the environment, traffic lane features in the environment; determining that the first machine-learned model is to be used for the environment; and controlling the vehicle based at least in part on the traffic light and traffic lane association label.

B: The system of paragraph A, wherein the that the first machine-learned model is to be used for the environment comprises determining that the mapping data is inconsistent with the environment.

C: The system of paragraph A or B, wherein the that the first machine-learned model is to be used for the environment comprises determining that a first confidence score associated with the first ML model is greater than a second confidence score associated with the second ML model.

D: The system of any of paragraphs A-C, wherein controlling the vehicle based at least in part on the traffic light and traffic lane association label comprises: determining that the vehicle is in traveling in the traffic lane associated with the traffic light based at least in part on the traffic light and traffic lane association label; determining a condition of the traffic light; and controlling the vehicle based at least in part on determining that the vehicle is in traveling in the traffic lane associated with the traffic light and the condition of the traffic light.

E: The system of any of paragraphs A-D, wherein first ML model is trained to determine that the traffic light is associated with the traffic lane based at least in part on: determining a probability that the first pixel is associated with the second pixel; determining that the probability meets or exceeds a probability threshold; and determining, based at least in part on the determining that the probability meets or exceeds the probability threshold, the traffic light and traffic lane association label for the first pixel and the second pixel.

F: One or more non-transitory computer-readable media storing instructions that, when executed by one or more processors, cause the one or more processors to perform operations comprising: receiving sensor data associated with a sensor configured at a vehicle traversing an environment; determining, based at least in part on the sensor data, a data structure representing the sensor data associated with at least a portion of the environment; executing a machine-learned (VL) model configured to determine, based at least in part on the data structure, an output data structure comprising a traffic control object and drivable region association label for a first data element and a second data element of the data structure, wherein: the first data element represents a traffic control object in the environment; the second data element represents a drivable region in the environment; and the traffic control object and drivable region association label indicates that the first data element is associated with the second data element; and controlling the vehicle based at least in part on the output data structure.

G: The one or more non-transitory computer-readable media of paragraph F, wherein the ML model is trained to perform traffic control object and drivable region association detection using labeled training data comprising one or more data elements labeled with the traffic control object and drivable region association label.

H: The one or more non-transitory computer-readable media of paragraphs F or G, wherein controlling the vehicle based at least in part on the output data structure comprises: executing a second ML model configured to determine, based on a second data structure associated with the environment, a second output data structure; and performing a fusion operation using the output data structure and the second output data structure to determine a fused output data structure; and controlling the vehicle based at least in part on the fused output data structure.

I: The one or more non-transitory computer-readable media of paragraph H, wherein the second ML model is configured to determine the second output data structure based at least in part on mapping data associated with the environment.

J: The one or more non-transitory computer-readable media of any of paragraphs F-I, wherein the ML model determines the output data structure comprising the traffic control object and drivable region association label for the first data element and the second data element based at least in part on a probability that the first data element is associated with the second data element.

K: The one or more non-transitory computer-readable media of any of paragraphs F-J, wherein: the traffic control object and drivable region association label is a first traffic control object and drivable region association label; the traffic control object is a first traffic control object; the output data structure comprises a second traffic control object and drivable region association label for a third data element and a fourth data element of the data structure; the third data element represents a second traffic control object in the environment that is distinct from the first traffic control object; the fourth data element represents a second drivable region in the environment that is distinct from the drivable region; the second traffic control object and drivable region association label indicates that the third data element is associated with the fourth data element; and the second traffic control object and drivable region association label is distinct from the first traffic control object and drivable region association label.

L: The one or more non-transitory computer-readable media of paragraph K, wherein controlling the vehicle comprises: determining that the vehicle is traveling in one of the drivable region and the second drivable region; and determining one of the traffic control object and the second traffic control object based at least in part on determining that the vehicle is traveling in one of the drivable region and the second drivable region, wherein controlling the vehicle is further based at least in part on one of the first traffic control object or the second traffic control object.

M: The one or more non-transitory computer-readable media of any of paragraphs F-L, wherein the operations further comprise executing the ML model to determine, based at least in part on the data structure, a second label for the first data element, wherein the output data structure further comprises the second label, wherein the second label is indicative of a classification of the first data element.

N: The one or more non-transitory computer-readable media of any of paragraphs F-M, wherein controlling the vehicle comprises providing the output data structure to a trajectory determination system configured to determine a vehicle trajectory based at least in part on the output data structure.

O: A method comprising: receiving sensor data associated with a sensor configured at a vehicle traversing an environment; determining, based at least in part on the sensor data, a data structure representing the sensor data associated with a portion of the environment; determining, by a machine-learned (ML) model, based at least in part on the data structure, an output data structure comprising a traffic control object and drivable region association label for a first data element and a second data element of the data structure, wherein: the first data element represents a traffic control object in the environment; the second data element represents a drivable region in the environment; and the traffic control object and drivable region association label indicates that the first data element is associated with the second data element; and providing the output data structure to a vehicle control component.

P: The method of paragraph O, wherein the ML model determines the output data structure further based at least in part on a first label for the first data element that is distinct from the traffic control object and drivable region association label and a second label for the second data element that is distinct from the traffic control object and drivable region association label.

Q: The method of paragraph P, wherein determining the traffic control object and drivable region association label for the first data element is further based at least in part on determining that a probability that the first data element is associated with the second data element meets or exceeds a threshold.

R: The method of any of paragraphs O-Q, wherein providing the output data structure to the vehicle control component comprises: using the output data structure to determine a top-down representation of the environment; and providing the top-down representation of the environment to the vehicle control component.

S: The method of any of paragraphs O-R, wherein the data structure comprises one or more of: a lidar point cloud; a two-dimensional image; or a three-dimensional representation of the environment.

T: The method of any of paragraphs O-S, wherein the traffic control object is one of: a traffic sign; a traffic light; or a human traffic controller.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more processors, wherein the instructions, when executed, cause the system to perform operations comprising:
receiving vision data associated with a vehicle traversing an environment;
determining, based at least in part on the vision data, a two-dimensional sensor perspective image representing a portion of the environment;
determining, by a first machine-learned (ML) model, based at least in part on the two-dimensional sensor perspective image, a first image comprising a traffic light and traffic lane association label for a first pixel and a second pixel of the two-dimensional sensor perspective image, wherein:
the first pixel represents at least a portion of a traffic light in the environment;
the second pixel represents at least a portion of a traffic lane in the environment; and
the traffic light and traffic lane association label indicates that the first pixel is associated with the second pixel;
determining, by a second ML model, based at least in part on mapping data associated with the environment, traffic lane features in the environment;
determining, based at least in part on determining that a first confidence score associated with the first ML model is greater than a second confidence score associated with the second ML model, that the first ML model is to be used for the environment; and
controlling the vehicle based at least in part on the traffic light and traffic lane association label.

2. The system of claim 1, wherein determining that the first ML model is to be used for the environment comprises determining that the mapping data is inconsistent with the environment.

3. The system of claim 1, wherein the operations further comprise:
performing a fusion operation using first output of the first ML model and second output of the second ML model to determine a fused output data structure; and
controlling the vehicle further based at least in part on the fused output data structure.

4. The system of claim 1, wherein controlling the vehicle based at least in part on the traffic light and traffic lane association label comprises:
determining that the vehicle is in traveling in the traffic lane associated with the traffic light based at least in part on the traffic light and traffic lane association label;
determining a condition of the traffic light; and
controlling the vehicle based at least in part on determining that the vehicle is in traveling in the traffic lane associated with the traffic light and the condition of the traffic light.

5. The system of claim 1, wherein first ML model is trained to determine that the traffic light is associated with the traffic lane based at least in part on:
determining a probability that the first pixel is associated with the second pixel;
determining that the probability meets or exceeds a probability threshold; and
determining, based at least in part on the determining that the probability meets or exceeds the probability threshold, the traffic light and traffic lane association label for the first pixel and the second pixel.

6. One or more non-transitory computer-readable media storing instructions that, when executed by one or more processors, cause the one or more processors to perform operations comprising:
receiving sensor data associated with a sensor configured at a vehicle traversing an environment;
determining, based at least in part on the sensor data, a data structure representing the sensor data associated with at least a portion of the environment;
executing a first machine-learned (ML) model configured to determine, based at least in part on the data structure, an output data structure comprising a traffic control object and drivable region association label for a first data element and a second data element of the data structure, wherein:
the first data element represents a traffic control object in the environment;
the second data element represents a drivable region in the environment; and
the traffic control object and drivable region association label indicates that the first data element is associated with the second data element;
executing a second ML model configured to determine, based at least in part on mapping data associated with the environment, traffic lane features in the environment;
determining, based at least in part on determining that a first confidence score associated with the first ML model is greater than a second confidence score associated with the second ML model, that the first ML model is to be used to control the vehicle in the environment; and
controlling the vehicle based at least in part on the output data structure.

7. The one or more non-transitory computer-readable media of claim 6, wherein the first ML model is trained to perform traffic control object and drivable region association detection using labeled training data comprising one or more data elements labeled with the traffic control object and drivable region association label.

8. The one or more non-transitory computer-readable media of claim 6, wherein controlling the vehicle based at least in part on the output data structure comprises:
executing the second ML model to determine, based on a second data structure associated with the environment, a second output data structure;
performing a fusion operation using the output data structure and the second output data structure to determine a fused output data structure; and
controlling the vehicle based at least in part on the fused output data structure.

9. The one or more non-transitory computer-readable media of claim 8, wherein the second ML model is configured to determine the second output data structure based at least in part on the mapping data associated with the environment.

10. The one or more non-transitory computer-readable media of claim 6, wherein the first ML model determines the output data structure comprising the traffic control object and drivable region association label for the first data element and the second data element based at least in part on a probability that the first data element is associated with the second data element.

11. The one or more non-transitory computer-readable media of claim 6, wherein:
the traffic control object and drivable region association label is a first traffic control object and drivable region association label;
the traffic control object is a first traffic control object;
the output data structure comprises a second traffic control object and drivable region association label for a third data element and a fourth data element of the data structure;
the third data element represents a second traffic control object in the environment that is distinct from the first traffic control object;
the fourth data element represents a second drivable region in the environment that is distinct from the drivable region;
the second traffic control object and drivable region association label indicates that the third data element is associated with the fourth data element; and the second traffic control object and drivable region association label is distinct from the first traffic control object and drivable region association label.

12. The one or more non-transitory computer-readable media of claim 11, wherein controlling the vehicle comprises:
   determining that the vehicle is traveling in one of the drivable region or the second drivable region; and
   determining one of the first traffic control object or the second traffic control object based at least in part on determining that the vehicle is traveling in one of the drivable region or the second drivable region,
      wherein controlling the vehicle is further based at least in part on one of the first traffic control object or the second traffic control object.

13. The one or more non-transitory computer-readable media of claim 6, wherein the operations further comprise executing the first ML model to determine, based at least in part on the data structure, a second label for the first data element, wherein the output data structure further comprises the second label, wherein the second label is indicative of a classification of the first data element.

14. The one or more non-transitory computer-readable media of claim 6, wherein controlling the vehicle comprises providing the output data structure to a trajectory determination system configured to determine a vehicle trajectory based at least in part on the output data structure.

15. A method comprising:
   receiving sensor data associated with a sensor configured at a vehicle traversing an environment;
   determining, based at least in part on the sensor data, a data structure representing the sensor data associated with a portion of the environment;
   determining, by a first machine-learned (ML) model, based at least in part on the data structure, an output data structure comprising a traffic control object and drivable region association label for a first data element and a second data element of the data structure, wherein:
      the first data element represents a traffic control object in the environment;
      the second data element represents a drivable region in the environment; and
      the traffic control object and drivable region association label indicates that the first data element is associated with the second data element;
   determining, by a second ML model, based at least in part on mapping data associated with the environment, traffic lane features in the environment;
   determining, based at least in part on determining that a first confidence score associated with the first ML model is greater than a second confidence score associated with the second ML model, that the first ML model is to be used to control the vehicle in the environment; and
   providing the output data structure to a vehicle control component.

16. The method of claim 15, wherein the first ML model determines the output data structure further based at least in part on a first label for the first data element that is distinct from the traffic control object and drivable region association label and a second label for the second data element that is distinct from the traffic control object and drivable region association label.

17. The method of claim 16, wherein determining the traffic control object and drivable region association label for the first data element is further based at least in part on determining that a probability that the first data element is associated with the second data element meets or exceeds a threshold.

18. The method of claim 15, wherein providing the output data structure to the vehicle control component comprises:
   using the output data structure to determine a top-down representation of the environment; and
   providing the top-down representation of the environment to the vehicle control component.

19. The method of claim 15, wherein the data structure comprises one or more of:
   a lidar point cloud;
   a two-dimensional image; or
   a three-dimensional representation of the environment.

20. The method of claim 15, wherein the traffic control object is one of:
   a traffic sign;
   a traffic light; or
   a human traffic controller.

* * * * *